March 28, 1961
A. L. IMSHAUG
2,976,762
DEPTH MEASURING APPARATUS FOR PRINTING
PLATES AND LIKE ARTICLES
Filed June 11, 1957
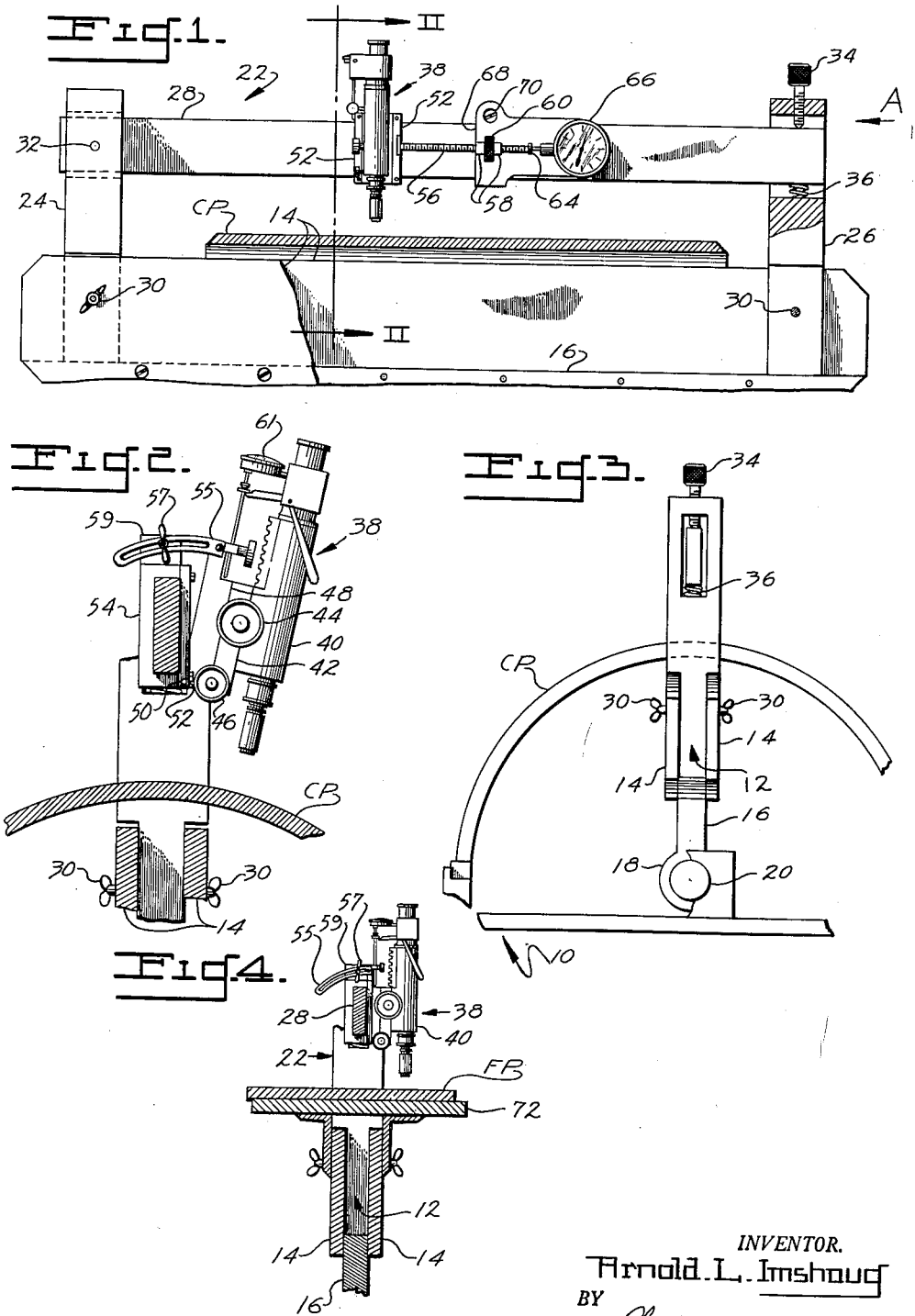
INVENTOR.
Arnold L. Imshaug
BY
Chapin & Neal
ATTORNEYS ated Mar. 28, 1961

2,976,762

DEPTH MEASURING APPARATUS FOR PRINTING PLATES AND LIKE ARTICLES

Arnold L. Imshaug, Brookwood, Montague, Mass.

Filed June 11, 1957, Ser. No. 665,083

4 Claims. (Cl. 88—14)

The present invention relates to apparatus for improvements in apparatus for checking the accuracy of surface formations, and though not necessarily so limited finds a particular utility in the art of printing.

Printing surfaces may be formed in many ways as by acid etch, routing or any other means which will provide a raised printing pattern. The printing pattern or surface is defined by relieved portions, the depths of which have much to do with printing acceptable work, particularly in making half-tone prints.

The principal object of the invention is to provide apparatus which will enable highly accurate depth measurements to be made over a wide area or the entire area of a printing plate or any other article which has surface characteristics in which accuracy of depth measurement is of importance.

Another object is to provide apparatus for obtaining such depth measurements at a rapid rate without any diminution of accuracy.

Another object is to provide improved apparatus for making depth measurements on both flat and curved plates.

The invention is characterized by the provision of a depth reading microscope. My novel apparatus includes means for mounting the microscope at all times normal to the relieved surface of a printing plate and movable over a considerable area of the plate at a fixed distance therefrom.

There may further be provided visual comparator means of the type disclosed and claimed in my copending application, Serial No. 657,814, filed May 8, 1957, now abandoned. Such comparator means enable readings to be made with the greatest of speed and accuracy.

The above and other objects and features of the invention including novel combinations of parts will be more fully apparent from a reading of the description of the disclosure found in the accompanying drawing and the novelty thereof pointed out in the claims.

In the drawing,

Fig. 1 is a view in side elevation of an embodiment of my improved apparatus as it would be used in checking the depth of relief of a curved printing plate;

Fig. 2 is a section, on an enlarged scale, taken on line II—II in Fig. 1;

Fig. 3 is an end view, looking in the direction of arrow A, of the apparatus seen in Fig. 1; and Fig. 4 is a view, partly in section, of the manner in which the present apparatus may be employed in checking flat plates.

The present invention may advantageously be combined with the improved apparatus for checking the dimensional characteristics of printing plates as disclosed in my copending application Serial No. 659,343, filed May 15, 1957.

Some of the basic elements of that apparatus are seen in Fig. 3 wherein reference character 10 designates a base which receives a curved printing plate CP in predetermined position thereon. A guideway 12 is formed by plates 14 extending from a longitudinal web 16. The web 16 is formed with a hub 18 which receives and is secured to a shaft 20, the axis of which is disposed coincident with the axis of the plate CP. Means, not shown, are provided to rotate the shaft 20 to dispose the guideway 12 at any desired point beneath the inner surface of plate CP and with the guideway 12 at all times normal thereto.

The guideway 12 receives a composite guide 22 (Fig. 1) fabricated in accordance with the present invention. The guide 22 comprises vertical posts 24, 26 and a horizontal bar or beam 28. The posts 24, 26 are secured in fixed relation to the plates 14 as by clamping wing nut and screw assemblies at 30. One end of the bar 28 is received within a slot in the upper end of post 24 and is pivotally mounted on a pin 32. The other end of the bar 28 is received within a slot in the upper end of post 26 and positioned therein by a screw 34 threaded into said post and bearing against its upper surface and a compression spring 36 bearing against its lower surface.

A depth reading microscope 38 is mounted on the bar 28 in the following manner. The microscope comprises a barrel 40 (Fig. 2) which is adjusted with respect to an intermediate member 42 by a knob 44 for rough focusing of the barrel and a knob 46, which adjusts the intermediate member 42 with respect to plate 48 for fine adjustment of the microscope. The plate 48 corresponds in a way to the base of conventionally mounted microscopes, but is pivotally mounted on a pin 50 which extends between a pair of straps 52 (see also Fig. 1). The straps 52 are fastened to a U-shaped member 54 and form therewith a slide embracing the bar 28.

An arm 55 is secured to the plate 48 and is slotted to receive a wing nut and screw 57 which is threaded into a projection 59 from the U-shaped member 54. With this arrangement the microscope barrel can be clamped in a position normal to the surface of the plate CP and can be adjusted normal to the surface of other diameter plates as well as flat plates.

It will be seen that a dial indicator 61 is mounted on the microscope 38 in accordance with the teachings of my above mentioned application Serial No. 657,814. The dial indicator 61 enables a depth reading made by the microscope 38 to be directly readable in a simple and accurate fashion as is more fully explained in the aforesaid application.

From the above it will also be apparent that the microscope 38 may be adjusted longitudinally along the bar 28 to check the accuracy of measurements between different points on the plate CP, as well as the accuracy of surface indentations. Means may be provided to effect this movement in a highly accurate manner and include a threaded rod 56 (Fig. 1) extending from the right hand strap 52. The rod 56 passes through a pair of lugs 58 and threadably receives an adjusting nut 60 therebetween and engages the plunger 64 of a dial indicator gauge 66. The lugs 58 extend from and the dial indicator 66 is mounted on a slide 68 which embraces the bar 28. Locking means, such as an eccentric 70, is provided for making the slide 68 fast upon the bar 28. When the slide 68 is secured in a given position, the microscope 38 may be lined up at a given point by viewing with the conventional hair line guide provided with such microscopes. The dial indicator 66 is then "zeroed," the microscope 38 moved to a position where it is lined up at an adjacent reference point and then the distance between the two points can be checked by reading directly from the dial indicator 66.

To insure the accuracy of comparative depth or width readings throughout the width of plate CP, the mounting means for the bar 28 are adjustable to obtain at all times a true parallel relation with the plate CP. These means include (Fig. 1) the pivotal mounting provided by the pin 32, the spring 36 and the screw 34 which may be manipulated to attain the desired parallel relationship of the surface and beam or bar 28.

As was alluded to above, the microscope 38 may be employed to make depth measurements on flat plates. This is illustrated in Fig. 4 wherein it will be seen that a table member 72 has been mounted on the plates 14 in a manner taught in my mentioned application Serial No. 659,343. The guide 22 is employed in the same fashion as above described to dispose the microscope 38 above a flat printing plate FP resting on the table 72. The microscope 38 has been pivoted to bring the barrel normal to the surface of the plate FP and is clamped in this position by the wing screw 57.

While the above description has been directed to the measurements as described on curved or flat printing plates it will be readily undersotod that the apparatus of this invention could be employed to make and check similar measurements of other similarly supported articles on which the surface configuration or characteristics may be of critical importance.

Having thus described my invention, what I claim as novel and desire to secure by Letters Patent of the United States is:

1. Apparatus for measuring the accuracy of surface configuration of curved printing plates and like articles, said apparatus comprising a depth reading microscope, a mounting plate to which the microscope is secured, a base on which a curved printing plate may be positioned in predetermined relation, a beam parallel with and rotatable about the axis of the curved printing plate, a slide on said beam, said mounting plate being pivotally mounted on said slide about an axis parallel to the axis of the curved plate, and means to clamp the mounting plate in a pivotal position with respect to said plate and said curved printing plate to bring the sight of said microscope normal to the portion of the printing surface being viewed.

2. Apparatus as in claim 1 in which supporting means for said beam are provided with the beam at one end being pivotally connected thereto and at the other end having means for adjusting pivotal position thereof to insure the accuracy of parallelism between said beam and the axis of said curved printing plate.

3. Apparatus for measuring the accuracy of surface configuration of printing plates and like articles, said apparatus comprising a depth reading microscope, a mounting plate to which the microscope is secured, a beam and a slide on said beam, said plate being pivotally mounted on the slide about an axis extending longitudinally of said beam with adjustable clamping means for shifting the angular position of the microscope barrel relative to said slide, thereby enabling the barrel of the microscope to be positioned normal to the surface of a printing plate, said beam having supporting means pivotable about an axis parallel to the pivot axis of said microscope carrying plate, a base on which a curved printing plate may be placed, means for positioning the curved printing plate on said base with its axis coincident with the axis of said beam supporting means and with the plate in underlying relation to said beam, said beam supporting means further having means for removably receiving a mounting platform on which a flat printing plate may be carried in underlying spaced relation to said beam.

4. Apparatus for measuring the accuracy of surface configuration of curved printing plates or the like over the entire working surface thereof, said apparatus comprising a base, means for positioning a curved printing plate thereon with its axis of curvature in predetermined relation relative thereto, a beam spanning the working surface of said printing plate, a beam support, bearing means on said base for pivotally mounting said beam and support for rotation about an axis coincident with the axis of said plate, said beam being parallel to said axis of rotation, a depth reading microscope, a slide riding on said beam and on which the depth reading microscope is mounted, said microscope being pivotally mounted relative to said beam about an axis parallel to the axis of beam rotation, and means for clamping the microscope with its barrel normal to the working surface of the printing plate whereby rotation of said beam and movement of said slide enables the microscope to traverse the entire working surface of the printing plate with the microscope substantially the same distance from the working surface thereof at all times.

References Cited in the file of this patent

UNITED STATES PATENTS

| 1,104,518 | Leslie et al. | July 21, 1914 |
| 1,765,624 | Scusa | June 24, 1930 |
| 2,527,669 | Yenni et al. | Oct. 31, 1950 |
| 2,539,597 | Staples | Jan. 30, 1951 |
| 2,607,270 | Briggs | Aug. 19, 1952 |
| 2,849,911 | Brunson | Sept. 2, 1958 |

FOREIGN PATENTS

| 899,112 | Germany | Dec. 7, 1953 |
| 715,636 | Great Britain | Sept. 15, 1954 |